Nov. 14, 1939.     H. L. NORTON     2,179,515
ANTISIDESLIPPING ATTACHMENT FOR MOTOR VEHICLES
Filed April 11, 1938
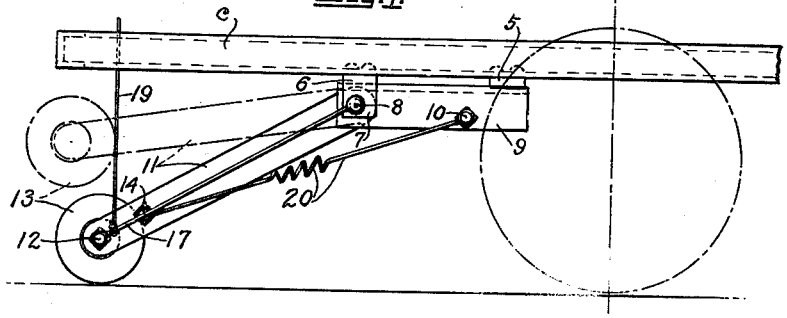
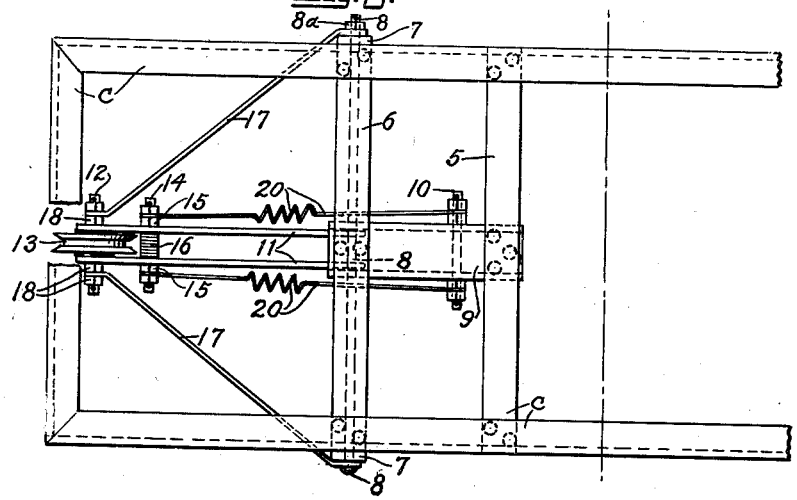
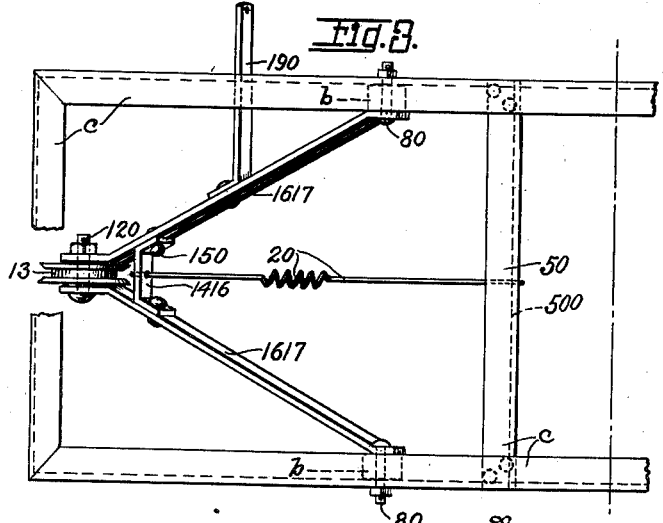
Inventor,
H. L. Norton.
By
Sterling P. Buck,
Attorney.

Patented Nov. 14, 1939

2,179,515

UNITED STATES PATENT OFFICE 2,179,515

ANTISIDESLIPPING ATTACHMENT FOR MOTOR VEHICLES

Homer L. Norton, Shepherd, Mich.

Application April 11, 1938, Serial No. 201,463

1 Claim. (Cl. 188—5)

This invention relates to ground-engaging brakes, and particularly to an improved antisideslipping attachment for motor vehicles.

One object of the invention is to provide an exceedingly effective and thoroughly practical antisideslipping device that is attachable to motor trucks, buses and other types of land-vehicles in such position as to utilize the law of leverage to the fullest practical extent.

Other objects and important features are pointed out or implied in the following details of description, in connection with the accompanying drawing in which:

Fig. 1 is a side elevation of one form of the invention attached on the rear end of a frame or chassis of a motor vehicle, the position of the rear wheels being indicated by the larger broken-line circle, and in which the broken vertical line passes through the axial center of the rear wheels.

Fig. 2 is a top plan view of the form shown in Fig. 1, a part of the rear beam of the frame being broken out, the broken line indicating the position of the axis of the rear wheels.

Fig. 3 is a top plan view of a modified form of the invention applied on a frame-section similar to that of Fig. 2, the broken line indicating the position of the axis of the rear wheels.

Referring to the drawing in detail, in which similar reference numerals refer to similar parts in the several views, the invention is described in detail as follows:

The frame or chassis c is of conventional channel-beam construction to which has been added (in Figs. 1 and 2) two cross-beams 5 and 6, the latter having down-turned ends 7 (see Fig. 1) which are apertured to receive pivotal elements which may be separate and disunited, or may be combined in a single rod or bolt 8. A channel-beam section 9 is united with the cross-beams 5 and 6, and its parallel flanges extend downward and are apertured to receive the pivotal element at the central part of the rod 8, also to receive a pivotal element 10. A bifurcated arm 11 is apertured at its front end to receive the pivotal element 8 at points between the flanges of the member 9, and is apertured at its rear end to receive an axle 12 which also receives a sharp-edged wheel 13 which is double-edged as shown, viz., having two knife-edged peripheries that are beveled on their inner sides, and unbeveled on their outer sides, so as to cut deeper and deeper into the surface of a road or street on which they are forced laterally by any force that tends to cause sideslipping thereof while rolling on such surface; but the invention is not restricted to a double-edged wheel. The bifurcated arm 11 may be of any appropriate shape and construction, but is here shown as composed of two flat bars that are united by means of a rod 14 having nuts 15 screw-threaded on its end portions, and having washers or other appropriate spacing means 16 on its intermediate portion. The nuts 15, being screwed tight against the bars of the arm 11, combine with the said bars and rod 14 and spacing means 16 to form a pivoted arm 11 which is quite rigid, but not sufficiently rigid to withstand very strong side-pressure; so diagonally disposed brace-rods 17 are provided with apertured and bent front and rear ends, the rear ends receiving the outer end portions of the axle 12 and being clamped between nuts 18 which are screw-threaded on the axle 12; so it is seen that the members 11, 12, 17 and 18 are combined in a rigid unit that can properly be termed a wheel-carrying unit. The front ends of the brace-rods are pivoted on the rod 8 and are securely located by means of the head of the rod and a nut 8a that is screw-threaded on this rod, so that the combination thus far disclosed effectually prevents any appreciable movement of the wheel 13 laterally of the chassis c. A cable 19, or other appropriate means, may be employed for raising and holding the rear end of the wheel-carrying unit in the broken-line position, while a spring element 20 is properly connected to the frame c and to the wheel-carrying unit for continually exerting a downward pull on the latter so as to assist gravitation in very quickly lowering the wheel 13 into ground-engaging position when the operator or driver releases the cable 19 from any appropriate retaining means (not shown). The spring 20, or a plurality of such springs, have the further purpose and effect of tightly but yieldingly pressing the sharp-edged wheel against the road or street, when in its operative position, for pressing the knife-edge or edges of the wheel into the surface of the road or street, or into any ice or sleet that the machine may have started to sideslip on, and thereby counteract the sideslipping tendency.

In the modified form, Fig. 3, a simpler construction is shown, viz., a construction which eliminates some of the parts shown in Figs. 1 and 2, for instance the parts 6, 7, 8, 9, 10, while substituting and combining other parts as follows:

Instead of the wheel-carrying unit being composed of the elements 11, 17 and their uniting means, I show (in Fig. 3) a rigid V-shaped bar-metal structure composed of apertured bars 1617 rigidly united by means of a cross-bar 1416 and rivets 150 or other appropriate means. The bifurcated rear end of this V-shaped unit is apertured to receive an axle 120 for the wheel 13. The front end of the V-shaped unit is apertured to receive either the rod 8 (Fig. 2) or two bolts or pivotal elements 80, and apertured bearings or blocks b may be welded in the channel of each side-beam of the chassis c so as to provide appropriate and strong anchorages for the pivots 80. Instead of the flat bar 5 (Fig. 1), I may employ an angle-beam 50 whose depending flange 500 is apertured to receive one end of the spring-element 20 and provide an anchorage for the latter's front end, while a similar anchorage is provided in the cross-bar 1416 for the rear end of the spring-element 20. Other similar anchorages for other spring-elements may be provided, or the single spring-element may be made sufficiently powerful and resilient to effect the purpose previously mentioned. In this modified form, an arm 190 constitutes means for raising and holding up the rear end of the wheel-carrying unit, and an aperture is provided in its outer end for attachment of a cable 19 if desirable.

While there are numerous structural differences between these two forms of the invention, there are several features that they have in common, and one of the most important of these is the fact that they both carry the ground-engaging knife-edged wheel substantially at the extreme rear end of the chassis and a considerable distance in rear of the rear supporting wheels of the vehicle, thus providing the vehicle with three ground-contacts substantially in a row, viz., the front supporting wheels, the rear supporting wheels and the antisideslipping wheel. Experience demonstrates the fact that skidding motor-vehicles tend to turn around, this showing that while the rear wheels are skidding the front wheels are not, and while the front wheels are skidding, the rear wheels are not. Now, with this nonsideslipping device in operation behind both sets of wheels of a vehicle, neither the front nor the rear wheels can slip sidewise so long as one pair of the vehicle's wheels do not slip. With this three-in-a-row contact of the vehicle with the road, short-turning of the vehicle is entirely avoided; and if the front and rear wheels slip sidewise while the vehicle is propelled forward, the wheels have an opportunity to regain traction before the arc of turning has become too great for rectifying. Moreover, when turning a bend in the road when it is slippery, it is the heavy rearwardly projecting rear end of a truck which exerts both centrifugal force and leverage in a tendency to throw the rear end of the truck tangentially of the road-bend; but such tangential tendency is effectively counteracted when the ground engaging or antisideslipping device is applied immediately at the rearmost end where the velocity and tangential tendency are greatest.

It is not intended to limit my patent protection to the precise details of construction and arrangement shown and described in the foregoing, for the invention is susceptible of numerous changes within the scope of the inventive ideas, as implied and claimed.

The following is what I claim as my invention:

The combination with the rear end-portion of a vehicle-chassis including side-beams, of a sharp-edged wheel, a wheel-carrying unit having said sharp-edged wheel journaled for rotation on its rear end and substantially under the extreme rear end of said vehicle-chassis, said wheel-carrying unit also including elements that diverge forwardly and have their front ends pivotally connected to the respective side-beams of the chassis in proper relation for preventing lateral movement of the sharp-edged wheel with respect to the chassis while permitting the sharp-edged wheel to be lowered into penetrating engagement with the part of a street or road that is substantially under the extreme rear end of the vehicle-chassis, for purposes specified.

HOMER L. NORTON.